(12) United States Patent
Balan et al.

(10) Patent No.: US 7,084,801 B2
(45) Date of Patent: Aug. 1, 2006

(54) APPARATUS AND METHOD FOR ESTIMATING THE DIRECTION OF ARRIVAL OF A SOURCE SIGNAL USING A MICROPHONE ARRAY

(75) Inventors: Radu Victor Balan, West Windsor, NJ (US); Justinian Rosca, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 40 days.

(21) Appl. No.: 10/454,917

(22) Filed: Jun. 5, 2003

(65) Prior Publication Data
US 2004/0013275 A1      Jan. 22, 2004

Related U.S. Application Data

(60) Provisional application No. 60/386,760, filed on Jun. 5, 2002.

(51) Int. Cl.
*H03M 1/12*      (2006.01)

(52) U.S. Cl. ......................................... 341/155; 381/92

(58) Field of Classification Search ............... 341/155, 341/159; 367/127, 125; 381/92, 122, 91
See application file for complete search history.

(56) References Cited

U.S. PATENT DOCUMENTS

| | | | | |
|---|---|---|---|---|
| 5,459,668 A | * | 10/1995 | Dogan et al. | 701/223 |
| 5,659,520 A | * | 8/1997 | Watson et al. | 367/125 |
| 5,694,474 A | * | 12/1997 | Ngo et al. | 381/66 |
| 6,069,961 A | * | 5/2000 | Nakazawa | 381/92 |
| 6,075,484 A | * | 6/2000 | Daniel et al. | 342/372 |
| 6,104,345 A | * | 8/2000 | Tweg et al. | 342/417 |
| 6,198,693 B1 | * | 3/2001 | Marash | 367/125 |
| 6,525,993 B1 | * | 2/2003 | Wake et al. | 367/127 |
| 6,526,148 B1 | * | 2/2003 | Jourjine et al. | 381/94.7 |
| 6,694,028 B1 | * | 2/2004 | Matsuo | 381/92 |
| 6,760,599 B1 | * | 7/2004 | Uhlik | 455/525 |
| 2002/0097885 A1 | * | 7/2002 | Birchfield et al. | 381/92 |
| 2003/0033150 A1 | * | 2/2003 | Balan et al. | 704/275 |

* cited by examiner

*Primary Examiner*—Peguy JeanPierre
(74) *Attorney, Agent, or Firm*—Donald B. Paschburg; F. Chau & Associates, LLC

(57) ABSTRACT

An apparatus for estimating the direction of arrival ("DOA") of a source signal includes microphones for transducing the source signal, amplifiers in signal communication with a corresponding one of the microphones, analog-to-digital converters in signal communication with a corresponding one of the amplifiers, and a digital processor in signal communication with the analog-to-digital converters for estimating the direction of arrival of the source signal; where a corresponding method for estimating the DOA of the source signal at one of several microphones includes estimating the measured signal spectral covariance matrix ("Rx"), and estimating the angle of the DOA responsive to the measured signal spectral covariance matrix.

20 Claims, 3 Drawing Sheets

APPARATUS AND METHOD FOR ESTIMATING THE DIRECTION OF ARRIVAL OF A SOURCE SIGNAL USING A MICROPHONE ARRAY

CROSS-REFERENCE TO RELATED APPLICATIONS

This application claims the benefit of U.S. Provisional Application Ser. No. 60/386,760, filed Jun. 5, 2002 and entitled "Apparatus and Method for Estimating the Direction Of Arrival of a Source Signal using a Microphone Array", which is incorporated herein by reference in its entirety.

BACKGROUND

The present disclosure relates to the estimation of the direction of arrival of a source signal using a microphone array. Applications may include Adaptive Signal Processing schemes for Hearing Aids, car kits, mobile communications, voice controlled devices, and the like.

There are various estimators known for estimating the Direction Of Arrival ("DOA") of a given source. With respect to a fixed system of coordinates, the DOA is defined as the set of angles that define the location of the source, up to the intrinsic symmetry of the array. Thus, for the 3-microphone array shown in FIG. 1, the only angle that can be estimated is theta, the angle between the incidence line and the microphone line. With such an array, any source located on a hyperboloid symmetric with respect to the microphone axis will correspond to the same delay between microphone signals. Such procedures are commonly known to those of ordinary skill in the pertinent art.

SUMMARY

These and other drawbacks and disadvantages of the prior art are addressed by an apparatus and method for estimating the direction of arrival of a source signal using a microphone array.

An apparatus for estimating the direction of arrival ("DOA") of a source signal includes microphones for transducing the source signal, amplifiers in signal communication with a corresponding one of the microphones, analog-to-digital converters in signal communication with a corresponding one of the amplifiers, and a digital processor in signal communication with the analog-to-digital converters for estimating the direction of arrival of the source signal.

A corresponding method for estimating the DOA of the source signal at one of several microphones includes estimating the measured signal spectral covariance matrix ("Rx"), and estimating the angle of the DOA responsive to the measured signal spectral covariance matrix. These and other aspects, features and advantages of the present disclosure will become apparent from the following description of exemplary embodiments, which is to be read in connection with the accompanying drawings.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an apparatus and method for estimating the direction of arrival of a source signal using a microphone array in accordance with the following exemplary figures, in which.

DETAILED DESCRIPTION OF PREFERRED EMBODIMENTS

The present disclosure presents an array signal processing apparatus and method for estimating the direction of arrival ("DOA") of a source signal in a noisy environment using a multi-sensor array. Embodiments of this disclosure may be used as a component block in general adaptive algorithms or schemes.

Possible applications include: Adaptive Signal Processing schemes for Hearing Aids, car kits, mobile communication, voice controlled devices, and the like. The present disclosure provides a method and apparatus to estimate the angle theta defining the DOA of a source. The presently disclosed approach makes novel use of statistical assumptions and optimization.

Figure 1:
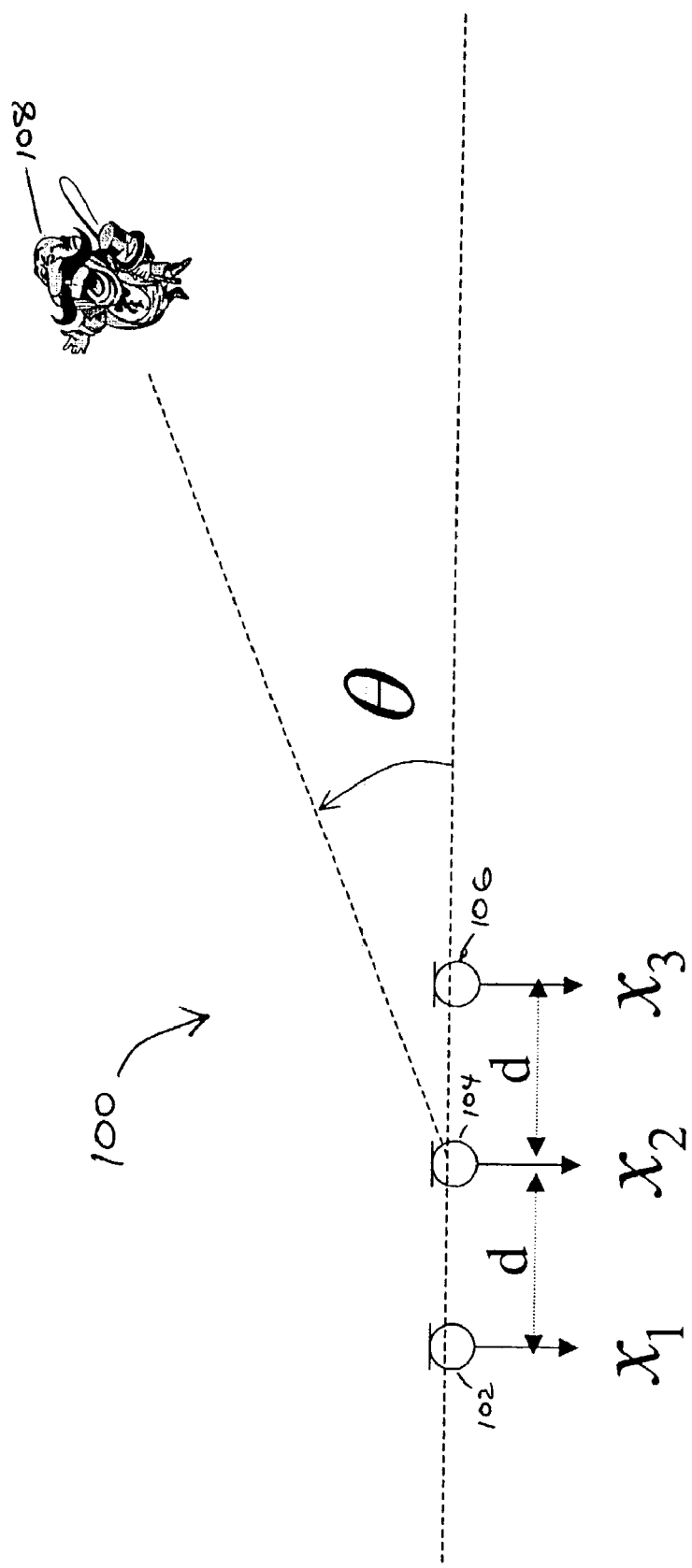
FIG. 1 shows a schematic geometric diagram of a 3-Microphone Array and the Direction Of Arrival ("DOA")

As shown in FIG. 1, a 3-Microphone Array with an incident DOA is indicated generally by the reference numeral 100. The exemplary array includes a first microphone 102, a second microphone 104 disposed a fixed distance d from the first microphone, and a third microphone 106 disposed a fixed distance d from the second microphone along a line intersecting the first and second microphones. A signal source 108 is disposed at an angle theta relative to the line of the microphones. The angle theta represents the DOA.

The mixing model is assumed as:

$$x_1(t)=s(t)+n_1(t) \quad (1)$$

$$\ldots \quad (2)$$

$$x_D(t)=s(t-(D-1)\delta\tau)+n_D(t) \quad (3)$$

where D is the number of microphones, $\delta=\cos(\theta)$ is a direct measure of the DOA, $\tau=df_x/c$ with d distance between adjacent microphones, $f_x$ is the sampling frequency, and c is the sound speed; $x1(t), \ldots, xD(t)$ are the signals as measured by the microphones, $s(t)$ are the source signals, and $n1(t), \ldots, nD(t)$ are the noise signals.

The distance d between microphones is assumed to be very small (smaller than $c/f_x$, so that $\tau \leq =1$ and therefore the noise signals are not independent. The following assumption is made regarding their statistics:

Assumption 1: The joint random variables $(N1(w), \ldots, ND(w))$, which are the Fourier transforms of $(n1, \ldots, nD)$, are Gaussian distributed with zero mean and covariance matrix:

$$R_n(w) = \rho_n(w) \begin{bmatrix} 1 & \frac{\sin(w\tau)}{w\tau} & \frac{\sin(2w\tau)}{2w\tau} \\ \frac{\sin(w\tau)}{w\tau} & 1 & \frac{\sin(w\tau)}{w\tau} \\ \frac{\sin(2w\tau)}{2w\tau} & \frac{\sin(w\tau)}{w\tau} & 1 \end{bmatrix} \quad (4)$$

It is also assumed that:

Assumption 2: The source signal Fourier transform S (w) is Gaussian distributed with zero mean and spectral power Rs(w).

The presently disclosed method optimally estimates (in the sense of maximum likelihood) the parameters θ, $R_x$ and $\rho_n$. The block diagram of this solution is depicted in FIG. 2.

Figure 2:
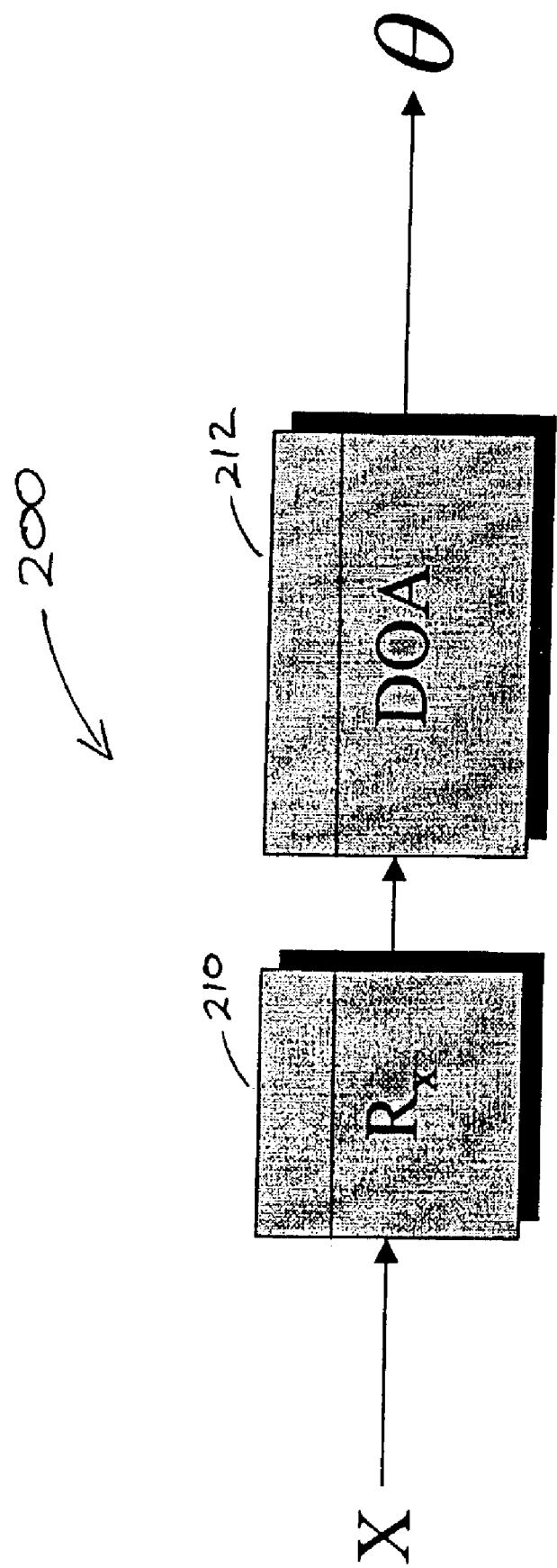
FIG. 2 shows a schematic block diagram of a DOA Estimator according to an illustrative embodiment of the present disclosure.

Turning to FIG. 2, a DOA Estimator according to an illustrative embodiment of the present disclosure is indicated generally by the reference numeral 200. The estimator 200 includes an Rx block 210 for receiving an output vector x from the microphones. The block 210 is coupled in signal communication with a DOA block 212 for providing the angle theta.

Figure 3:
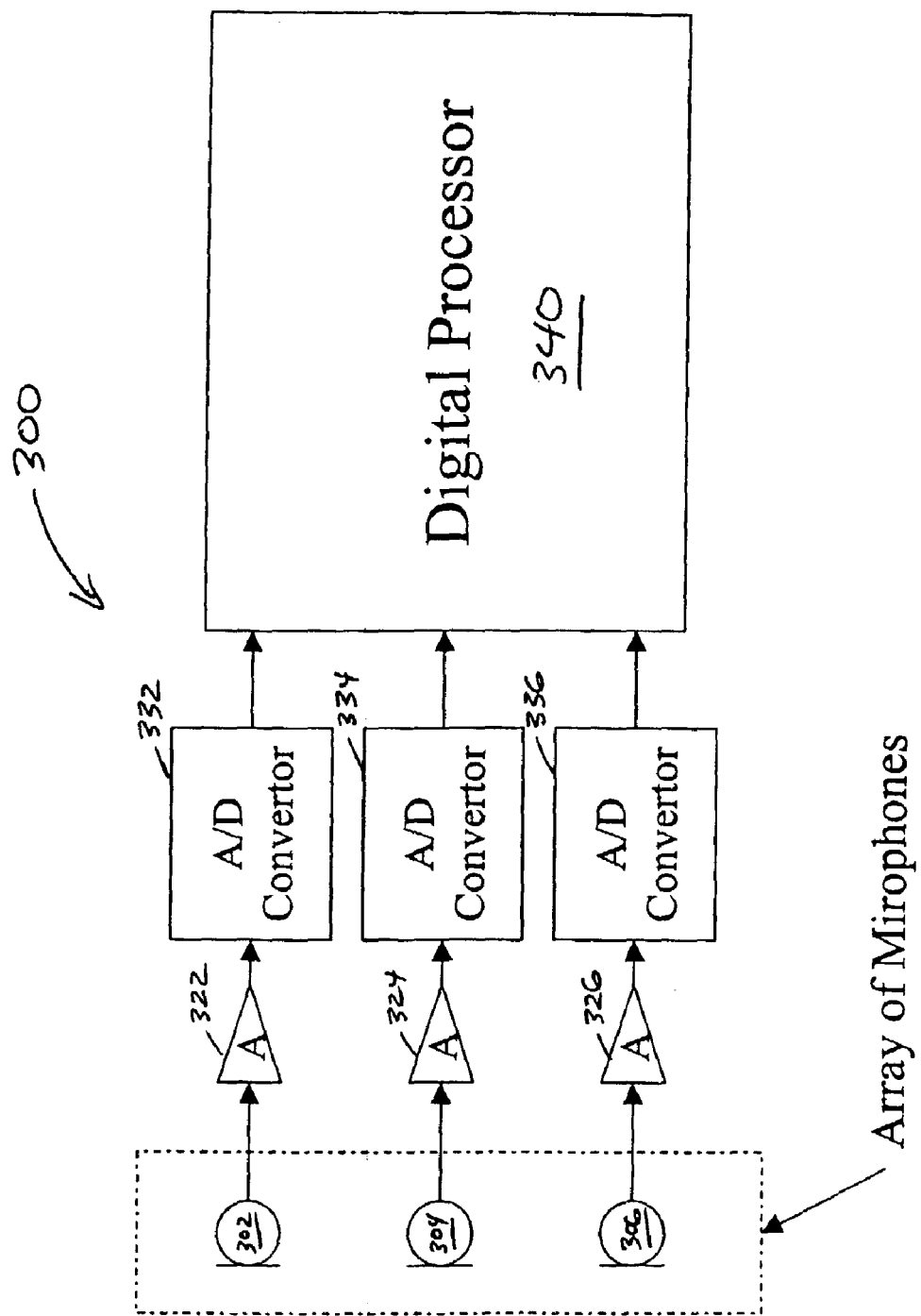
FIG. 3 shows a schematic hardware diagram of a DOA Estimator according to an illustrative embodiment of the present disclosure.

Turning now to FIG. 3, a DOA Estimator according to an illustrative embodiment of the present disclosure is indicated generally by the reference numeral 300. The DOA estimator 300 includes an exemplary array of microphones comprising a first microphone 302, a second microphone 304 and a third microphone 306. The first microphone 302 is coupled in signal communication to a first amplifier 322, which, in turn, is coupled in signal communication to a first analog-to-digital converter 332. The output of the analog-to-digital converter 332 is coupled in signal communication to a digital processor 340.

Similarly, the second microphone 304 is coupled in signal communication to a second amplifier 324, which, in turn, is coupled in signal communication to a second analog-to-digital converter 334. The output of the analog-to-digital converter 334 is also coupled in signal communication to the digital processor 340. Likewise, the third microphone 306 is coupled in signal communication to a third amplifier 326, which, in turn, is coupled in signal communication to a third analog-to-digital converter 336. The output of the analog-to-digital converter 336 is also coupled in signal communication to the digital processor 340.

Thus, a physical embodiment of the scheme is presented in FIG. 3. The component blocks of FIG. 2 are now described, and a physical embodiment is presented as in FIG. 3.

Components of the DOA Estimator are as follows: The DOA estimator comprises two blocks: the first block 210 of FIG. 2 provides for estimation of Rx, and the second block 212 of FIG. 2 provides for estimation of the DOA. The microphones 302, 304 and 306 of FIG. 3 convert acoustic pressure into electrical signals, which are next amplified by the Amplifiers 322, 324 and 326, respectively, and converted into the digital domain by the A/D Converters 332, 334 and 336, respectively. The digitized measured signals are denoted by x1, . . . , xD, where D is the number of microphones. In the following exemplary embodiment, the description of the algorithms is for the case D=3, but this is by no means a restriction to the applicability of the principle. The rational for the formulas (eqns. 7–17) is also presented.

Referring to FIG. 2, the measured signal spectral covariance matrix Rx is estimated as follows:

1. Initialize $R_x(w)=0$, for M values of w, $$w = 0, \frac{2\pi}{M}, \ldots, \frac{2\pi(M-1)}{M};$$

2. Using the last M samples, $x_1(t)$, $x_1(t-1)$, . . . , $x_1(t-M+1)$, $x_2(t)$, $x_2(t-1)$, . . . , $x_2(t-M+1)$, $x_3(t)$, $x_3(t-1)$, . . . , $x_3(t-M+1)$, compute the windowed Fourier transform:

$$X_k(w) = \sum_{l=0}^{M-1} w(l)x(t-l)e^{-iwl}, k = 1, 2, 3, w = 0, \frac{2\pi}{M}, \ldots, \frac{2\pi(M-1)}{M} \quad (5)$$

where w(0), . . . , w(M-1) is the window, and w is the frequency.

3. Update the matrices $R_x$ (w)

$$R_x^{updated}(w) = (1-\alpha)R_x^{previous}(w) + \alpha \begin{bmatrix} X_1(w) \\ X_2(w) \\ X_3(w) \end{bmatrix} \begin{bmatrix} \overline{X_1(w)} & \overline{X_2(w)} & \overline{X_3(w)} \end{bmatrix} \quad (6)$$

where α is a learning rate.

Referring again to FIG. 3, the exemplary embodiment of a DOA (θ) Estimator is described with respect to the following algorithm:

1. For each frequency w in $$S = \left\{0, \frac{2\pi}{M}, \ldots, \frac{2\pi(M-1)}{M}\right\},$$

repeat the following steps:

(a) Set the 3×3 matrix $$M(w) \begin{bmatrix} 1 & \frac{\sin(w\tau)}{w\tau} & \frac{\sin(2w\tau)}{2w\tau} \\ \frac{\sin(w\tau)}{w\tau} & 1 & \frac{\sin(w\tau)}{w\tau} \\ \frac{\sin(2w\tau)}{2w\tau} & \frac{\sin(w\tau)}{w\tau} & 1 \end{bmatrix} \quad (7)$$

where $\tau = df_s/c$, d is the distance between two adjacent microphones, $f_s$ is the sampling frequency, and c is the speed of sound;

(b) Solve the third order polynomial equation:

$$det(\lambda M - R_x) = 0 \quad (8)$$

where λ is the unknown.

(c) Order the solution $\lambda_3 \geq \lambda_2 \geq \lambda_1$ (There are three solutions because equation (8) is of order three, and, in turn, this is due to the number of microphones D.) Set $$\rho_n = \lambda_1 \quad (9)$$

(d) Solve the third order polynomial equation $$det(\mu I - R_x + \rho_n M) = 0 \quad (10)$$

where μ is the unknown, and I is the 3×3 identity matrix.

(e) Order the solutions $\mu_3 \geq \mu_2 \geq \mu_1$ (note $\mu_1 = 0$); set $R_x(w) = \mu_3(w)$.

(f) Find a nonzero solution $z = [z_1 \; z_2 \; z_3]^T$ of the linear system $$\mu_3 I - R_x - \rho_n M)z = 0 \quad (11)$$

(g) Define $$w_1(w) = \frac{z_2}{z_1} \quad (12)$$

$$w_2\left(2w + \frac{2\pi}{M}\right) \bmod 2\pi = \frac{z_3}{z_1} \quad (13)$$

$$w_2\left(2w + \frac{2\pi}{M} \bmod 2\pi\right) = 0 \quad (14)$$

for $w \in S$.

$$J(\delta) = \mathrm{real}\left(\sum_{w \in S} e^{iw\delta\tau/N}(w_1(w) + w_2(w))\right) \quad (15)$$

for $\delta = -N, -N+1, \ldots N$.

3. Find the maximum of J for $\delta$ over $\{-N, -N+1, \ldots, N\}$, say $\delta_{max}$, $$\delta_{max} = \arg\max_{\delta \in \{-N, -N+1, \ldots, N\}} J(\delta) \quad (16)$$

4. Compute the DOA $\theta$ through $$\theta = \arccos\left(\frac{\delta_{max}}{N}\right) \quad (17)$$

In operation, the exemplary embodiment of FIG. 3 is implemented with the following exemplary apparatus, including an array of 3 (in this exemplary case) closely arranged microphones 302, 304 and 306 where the distance between two adjacent microphones is around 1 cm; amplifiers 322, 324 and 326 and A/D converters 332, 334 and 336, one of each for each microphone; and a digital processor 340.

The computations presented in the previous section may be implemented very efficiently so that the total computational load is fairly small. The following features are also pertinent:

1. The third order algebraic equations (8) and (11) have exact solutions in closed form.
2. the equation (11) is of the form $\mu^3 + \alpha\mu^2 + b\mu = 0$; thus one of the solutions is $\mu_1 = 0$, and the computation of the other two roots involves just a couple of operations.

Exemplary values for the parameters are summarized as follows:

1. D=3[microphones]
2. M=128[samples]
3. $\alpha$=0.01
4. N=100
5. d=1[cm]
6. $f_s$=20000[Hz]
7. w is the Hamming window of size M;

It shall be understood that the above-mentioned values are merely exemplary. Thus, those of ordinary skill in the pertinent art may contemplate various other values without diminishing the generality of the algorithm or of the apparatus.

In this section we present the rationale for the expressions (7–17). The likelihood of the parameters $\theta$, $R_s(\cdot)$, $\rho_n(w)$ given the model (1–3) is $$L(\theta, R_s(\cdot), \rho_n(\cdot)) = \quad (18)$$

$$\prod_{w \in S} \frac{1}{\pi^{3/2} \det(R_s v^* v + \rho_n M)} \exp(-\mathrm{Trace}(R_x(R_s vv^* + \rho_n M)^{-1}))$$

where we have omitted the explicit dependency on w of $R_s \rho_n$, M, v, $R_x$ for the sake of clarity, and $$v = \begin{bmatrix} 1 & e^{-iw\tau\cos(\theta)} & e^{-2iw\tau\cos(\theta)} \end{bmatrix} \quad (19)$$

$$(\hat{\theta}, \hat{R}_s(\cdot), \hat{\rho}_n(\cdot)) = \arg\max_{\theta, R_s(\cdot), \rho_n(\cdot)} L(\theta, R_s(\cdot), \rho_n(\cdot)) \quad (20)$$

For sufficiently many samples, the approximate solution to the above estimator can be found by using the Covariance Matching Estimation Technique ("COMET"), together with the Extended Invariance Principle as known in the art. This amounts to solving at every frequency w the problem $$\arg\min_{z, R_s, \rho_n} \mathrm{Trace}(R_x - R_x zz^* - \rho_n M)^2) \quad (21)$$

where $z = [1 \; z_2 \; z_3]$ is the unknown vector, constraine to be 1 on the first component. This problem is solved, under the additional positivity constraint $R_s zz^* + \rho_n M \leq R_x$ in 8–11. Once z has been obtained at every frequency, the solution for $\theta$ is obtained through the optimization $$\hat{\theta} = \arg\min_\theta \sum_{w \in S} \left|z_2(w) - e^{-iw\tau\cos(\theta)}\right|^2 + \left|z_3(w) - e^{-2iw\tau\cos(\theta)}\right| \quad (22)$$

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. An apparatus for estimating the direction of arrival ("DOA") of a source signal, the apparatus comprising:
   a plurality of microphones for transducing the source signal;
   a plurality of amplifiers, each amplifier in signal communication with a corresponding one of the plurality of microphones;
   a plurality of analog-to-digital converters, each converter in signal communication with a corresponding one of the plurality of amplifiers; and
   a digital processor in signal communication with the plurality of analog-to-digital converters for estimating the direction of arrival of the source signal and optimizing the DOA solution in the statistical sense of maximum likelihood,
   wherein the digital processor comprises a DOA portion for estimating the angle of the direction of arrival.

2. An apparatus as defined in claim 1 wherein the source signal is the dominant source signal of a plurality of source signals.

3. An apparatus as defined in claim 1 wherein the digital processor comprises an optimization portion for optimizing the DOA solution in the statistical sense of maximum likelihood.

4. An apparatus as defined in claim 1 wherein the digital processor comprises an Rx portion for estimating the measured signal spectral covariance matrix ("Rx").

5. An apparatus as defined in claim 1 wherein the digital processor differentiates between any source located on a hyperboloid symmetric with respect to the microphone axis that corresponds to the same delay between microphone signals.

6. A method for estimating the direction of arrival ("DOA") of a source signal at one of a plurality of microphones, the method comprising:
   estimating the measured signal spectral covariance matrix ("Rx");
   estimating the angle of the direction of arrival ("DOA") responsive to the measured signal spectral covariance matrix; and
   optimizing the DOA solution in the statistical sense of maximum likelihood,
   wherein estimating the measured signal spectral covariance matrix ("Rx") comprises:
   receiving signal samples;
   initializing the measured signal spectral covariance matrix;
   computing a windowed Fourier transform responsive to the signal samples; and
   updating the measured signal spectral covariance matrix responsive to the windowed Fourier transform.

7. A method as defined in claim 6, further comprising differentiating between any source located on a hyperboloid symmetric with respect to the microphone axis that corresponds to the same delay between microphone signals.

8. A method for estimating the direction of arrival ("DOA") of a source signal at one of a plurality of microphones, the method comprising:
   estimating the measured signal spectral covariance matrix ("Rx");
   estimating the angle of the direction of arrival ("DOA") responsive to the measured signal spectral covariance matrix; and
   optimizing the DOA solution in the statistical sense of maximum likelihood,
   wherein estimating the angle of the direction of arrival ("DOA") comprises:
   selecting a frequency;
   forming a matrix responsive to each of the selected frequency and the distance between two adjacent microphones;
   solving a polynomial equation responsive to each of the formed matrix and the measured signal spectral covariance matrix to obtain a plurality of solutions, the plurality equaling the number of microphones;
   ordering the plurality of solutions;
   finding a non-zero solution; and
   computing the DOA in response to the ordered and non-zero solutions.

9. A method as defined in claim 8 wherein the estimated angle of the direction of arrival ("DOA") is optimized in the statistical sense of maximum likelihood.

10. A method as defined in claim 8 wherein the estimated angle of the direction of arrival ("DOA") corresponds to the source signal that is the dominant source signal of a plurality of source signals.

11. An apparatus for estimating the direction of arrival ("DOA") of a sonic source signal, the apparatus comprising:
    covariance means for estimating the measured signal spectral covariance matrix ("Rx");
    direction of arrival means for estimating the angle of the direction of arrival ("DOA") responsive to the measured signal spectral covariance matrix; and
    optimization means for optimizing the DOA solution in the statistical sense of maximum likelihood,
    wherein the covariance means for estimating the measured signal spectral covariance matrix ("Rx") comprises:
    microphone means for receiving signal samples;
    initialization means for initializing the measured signal spectral covariance matrix;
    Fourier means for computing a windowed Fourier transform responsive to the signal samples; and
    update means for updating the measured signal spectral covariance matrix responsive to the windowed Fourier transform.

12. An apparatus as defined in claim 11, further comprising differentiation means for differentiating between any source located on a hyperboloid symmetric with respect to the microphone axis that corresponds to the same delay between microphone signals.

13. An apparatus for estimating the direction of arrival ("DOA") of a sonic source signal, the apparatus comprising:
    covariance means for estimating the measured signal spectral covariance matrix ("Rx");
    direction of arrival means for estimating the angle of the direction of arrival ("DOA") responsive to the measured signal spectral covariance matrix; and
    optimization means for optimizing the DOA solution in the statistical sense of maximum likelihood,
    wherein the direction of arrival means for estimating the angle of the direction of arrival ("DOA") comprises:
    selection means for selecting a frequency;
    matrix means for forming a matrix responsive to each of the selected frequency and the distance between two adjacent microphones;

solution means for solving a polynomial equation responsive to each of the formed matrix and the measured signal spectral covariance matrix to obtain a plurality of solutions, the plurality equaling the number of microphones;

ordering means for ordering the plurality of solutions;

non-zero means for finding a non-zero solution; and computation means for computing the DOA in response to the ordered and non-zero solutions.

14. An apparatus as defined in claim 13, further comprising dominant source means for estimating the angle of the direction of arrival ("DOA") corresponding to the source signal that is the dominant source signal of a plurality of source signals.

15. An apparatus as defined in claim 13, further comprising optimization means for optimizing the estimated angle of the direction of arrival ("DOA") in the statistical sense of maximum likelihood.

16. A program storage device readable by machine, tangibly embodying a program of instructions executable by the machine to perform program steps for estimating the direction of arrival ("DOA") of a source signal at one of a plurality of microphones, the program steps comprising:

estimating the measured signal spectral covariance matrix ("Rx");

estimating the angle of the direction of arrival ("DOA") responsive to the measured signal spectral covariance matrix; and optimizing the DOA solution in the statistical sense of maximum likelihood, wherein the program steps for estimating the measured signal spectral covariance matrix ("Rx") comprise:

receiving signal samples;

initializing the measured signal spectral covariance matrix;

computing a windowed Fourier transform responsive to the signal samples; and updating the measured signal spectral covariance matrix responsive to the windowed Fourier transform.

17. A program storage device as defined in claim 16, the program steps further comprising differentiating between any source located on a hyperboloid symmetric with respect to the microphone axis that corresponds to the same delay between microphone signals.

18. A program storage device readable by machine, tangibly embodying a program of instructions executable by the machine to perform program steps for estimating the direction of arrival ("DOA") of a source signal at one of a plurality of microphones, the program steps comprising:

estimating the measured signal spectral covariance matrix ("Rx");

estimating the angle of the direction of arrival ("DOA") responsive to the measured signal spectral covariance matrix; and optimizing the DOA solution in the statistical sense of maximum likelihood, wherein the program steps for estimating the angle of the direction of arrival ("DOA") comprise:

selecting a frequency;

forming a matrix responsive to each of the selected frequency and the distance between two adjacent microphones;

solving a polynomial equation responsive to each of the formed matrix and the measured signal spectral covariance matrix to obtain a plurality of solutions, the plurality equaling the number of microphones;

ordering the plurality of solutions;

finding a non-zero solution; and computing the DOA in response to the ordered and non-zero solutions.

19. A program storage device as defined in claim 18 wherein the estimated angle of the direction of arrival ("DOA") corresponds to the source signal that is the dominant source signal of a plurality of source signals.

20. A program storage device as defined in claim 18 wherein the estimated angle of the direction of arrival ("DOA") is optimized in the statistical sense of maximum likelihood.

* * * * *